(12) United States Patent
Yao et al.

(10) Patent No.: US 10,106,265 B2
(45) Date of Patent: Oct. 23, 2018

(54) STABILIZER ASSEMBLY FOR AN AIRCRAFT AFT ENGINE

(71) Applicant: General Electric Company, Schenectady, NY (US)

(72) Inventors: Jixian Yao, Niskayuna, NY (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 15/191,586

(22) Filed: Jun. 24, 2016

(65) Prior Publication Data

US 2017/0369152 A1 Dec. 28, 2017

(51) Int. Cl.
| | |
|---|---|
| *B64D 27/20* | (2006.01) |
| *B64C 5/02* | (2006.01) |
| *B64C 1/26* | (2006.01) |
| *B64D 27/18* | (2006.01) |
| *B64C 7/02* | (2006.01) |
| *B64C 21/00* | (2006.01) |
| *B64D 27/12* | (2006.01) |
| *B64D 27/14* | (2006.01) |
| *B64D 27/26* | (2006.01) |
| *B64D 33/02* | (2006.01) |

(52) U.S. Cl.
CPC ............... *B64D 27/20* (2013.01); *B64C 1/26* (2013.01); *B64C 5/02* (2013.01); *B64C 7/02* (2013.01); *B64C 21/00* (2013.01); *B64D 27/12* (2013.01); *B64D 27/14* (2013.01); *B64D 27/18* (2013.01); *B64D 27/26* (2013.01); *B64D 2033/0226* (2013.01)

(58) Field of Classification Search
CPC .. B64C 1/26; B64C 5/02; B64D 27/20; B64D 2033/0226

See application file for complete search history.

(56) References Cited

U.S. PATENT DOCUMENTS

| | | | |
|---|---|---|---|
| 3,194,516 A * | 7/1965 | Messerschmitt | B64D 27/20 244/74 |
| 6,089,504 A | 7/2000 | Williams et al. | |
| 6,808,140 B2 | 10/2004 | Moller | |
| 7,938,358 B2 | 5/2011 | Dietrich et al. | |
| (Continued) | | | |

OTHER PUBLICATIONS

Lei et al., "L1 adaptive controller for air-breathing hypersonic vehicle with flexible body dynamics", American Control Conference, 2009. ACC '09., pp. 3166-3171, Jun. 10-12, 2009, St. Louis, MO.

*Primary Examiner* — Joseph W Sanderson
(74) *Attorney, Agent, or Firm* — GE Global Patent Operation; Nitin Joshi

(57) ABSTRACT

An aerodynamic stabilizer assembly for stabilizing an aft fan mounted to a fuselage of an aircraft is presented. The stabilizer assembly includes one or more generally horizontal stabilizers for mounting to a nacelle of the aft fan and the fuselage so as to stabilize the aft fan. Each of the generally horizontal stabilizers includes an inner portion and an outer portion. The inner portions are mounted to a nacelle of the aft fan and the fuselage at a predetermined downward angle with respect to a central axis of the aft fan so as to direct airflow upwards and into the aft fan, the outer portion being mounted to the inner portion.

16 Claims, 6 Drawing Sheets

(56) References Cited

U.S. PATENT DOCUMENTS

| | | | |
|---|---|---|---|
| 7,963,485 B2 | 6/2011 | Koneczny | |
| 8,360,359 B2 | 1/2013 | Llamas Sandin et al. | |
| 8,393,567 B2* | 3/2013 | Moore | B64D 27/14 |
| | | | 244/54 |
| 8,505,846 B1 | 8/2013 | Sanders, II | |
| 9,162,748 B2* | 10/2015 | Brunken, Jr. | B64C 1/26 |
| 9,611,034 B1* | 4/2017 | Suciu | B64C 21/08 |
| 9,821,917 B2* | 11/2017 | Becker | B64C 21/06 |
| 2007/0170309 A1 | 7/2007 | Schafroth | |
| 2017/0361939 A1* | 12/2017 | Negulescu | B64D 27/14 |

* cited by examiner

STABILIZER ASSEMBLY FOR AN AIRCRAFT AFT ENGINE

FIELD OF THE INVENTION

The present subject matter relates generally to aft engines for aircraft propulsion systems, and more particularly to stabilizer/elevator root portion features to induce fuselage boundary layers upwards to the aft fan.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and the fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

As such, systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a non-uniform or distorted velocity profile. As a result, such turbofan jet engines can experience an efficiency loss minimizing or negating any benefits of reduced drag on the aircraft.

In addition, some propulsion systems include an electrically-driven aft fan on the aircraft empennage to derive propulsive benefit by ingesting fuselage boundary layers. Such systems may also include a vertical stabilizer or tail having a rudder flap for yaw control and a pair of horizontal stabilizers, each having an elevator flap for pitch control. Such horizontal stabilizers are typically mounted between the fuselage and the aft fan so as to stabilize the fan. During operation, however, a boundary layer can develop at the bottom of the fuselage creating an area of low-momentum air. Such air can increase drag over the nacelle of the aft fan.

In view of the aforementioned, an improved stabilizer assembly for an aft fan having improved propulsive efficiency and reduced drag on the aircraft would be useful. More particularly, an aft fan stabilizer assembly having a shape to encourage airflow upward and into the fan would be especially beneficial.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a propulsion system for an aircraft having a fuselage. The propulsion system includes an aft engine configured to be mounted to the aircraft at an aft end of the aircraft. The aft engine includes a fan having a plurality of fan blades that are rotatable about a central axis. Further, the fan includes a nacelle surrounding the plurality of fan blades. The propulsion system may also include a stabilizer assembly having at least one generally horizontal stabilizer including an inner portion and an outer portion. The inner portion is mounted to the nacelle of the fan and the fuselage at a predetermined downward angle with respect to the central axis so as to direct airflow upwards and into the fan. Further, the outer portion is mounted to the inner portion.

In another aspect, the present disclosure is directed to a boundary layer ingestion fan assembly for mounting to an aft end of a fuselage of an aircraft. The boundary layer ingestion fan assembly includes a fan rotatable about a central axis of the boundary layer ingestion fan. Further, the fan includes a plurality of fan blades. The boundary layer ingestion fan assembly also includes a nacelle surrounding the plurality of fan blades of the fan. The nacelle defines an inlet with the fuselage of the aircraft. Thus, the inlet extends substantially around the fuselage of the aircraft when the boundary layer ingestion fan is mounted at the aft end of the aircraft. The boundary layer ingestion fan assembly also includes a stabilizer assembly having at least one generally horizontal stabilizer including an inner portion and an outer portion. The inner portion is mounted to the nacelle of the fan and the fuselage at a predetermined downward angle with respect to the central axis so as to direct airflow upwards and into the fan. Further, the outer portion is mounted to the inner portion.

In yet another aspect, the present disclosure is directed to an aerodynamic stabilizer assembly for stabilizing an aft fan mounted to a fuselage of an aircraft. The stabilizer assembly includes at least two generally horizontal stabilizers for mounting to opposite sides of a nacelle of the aft fan and the fuselage so as to stabilize the aft fan. Each of the generally horizontal stabilizers includes an inner portion and an outer portion. As such, the inner portions are mounted to a nacelle of the aft fan and the fuselage at a predetermined downward angle with respect to a central axis of the aft fan so as to direct airflow upwards and into the aft fan, the outer portion being mounted to the inner portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
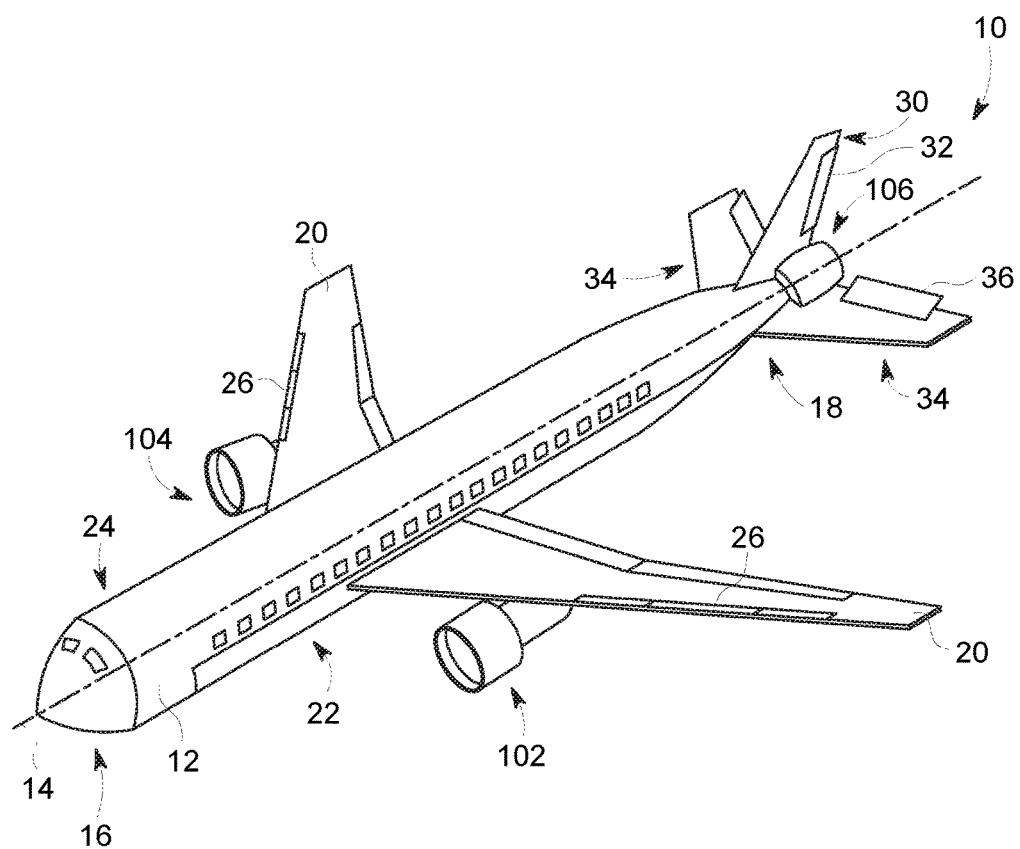
FIG. 1 illustrates a perspective view of one embodiment of an aircraft according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to an aerodynamic stabilizer assembly for stabilizing an aft fan mounted to a fuselage of an aircraft. For example, the stabilizer assembly includes one or more generally horizontal stabilizers for mounting to a nacelle of the aft fan and the fuselage so as to stabilize the aft fan. Each of the generally horizontal stabilizers includes an inner portion and an outer portion. As such, the inner portions are mounted to a nacelle of the aft fan and the fuselage at a predetermined downward angle with respect to a central axis of the aft fan so as to direct airflow upwards and into the aft fan, the outer portion being mounted to the inner portion.

Figure 2:
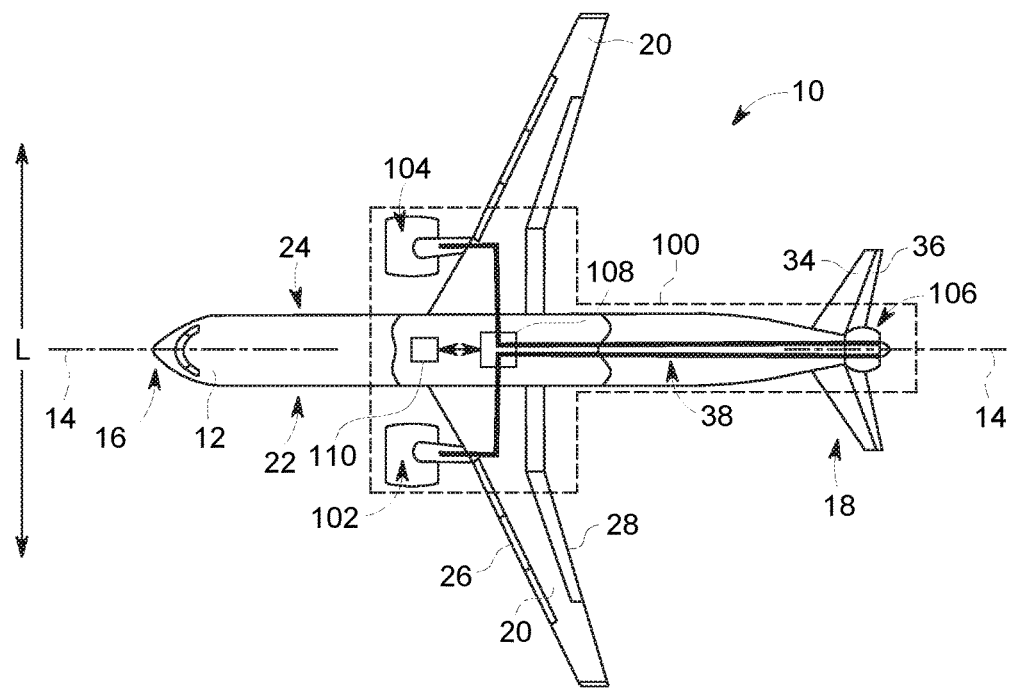
FIG. 2 illustrates a top view of the aircraft of FIG. 1.
Figure 3:
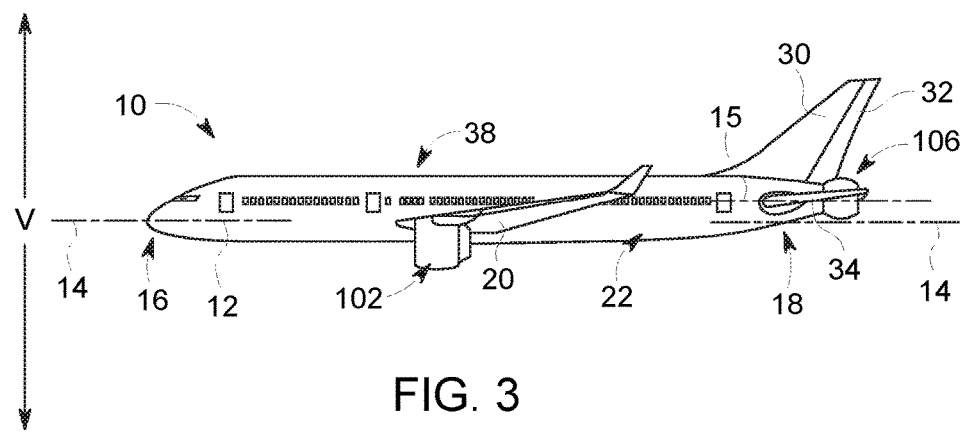
FIG. 3 illustrates a port side view of the aircraft of FIG. 1.

Referring now to the drawings, wherein identical numerals indicate the same elements throughout the figures, FIG. 1 illustrates a perspective view of one embodiment of an aircraft 10 according to the present invention. FIG. 2 illustrates a top view of the aircraft 10 as illustrated in FIG. 1. FIG. 3 illustrates a port side view of the aircraft 10 as illustrated in FIG. 1. As shown in FIGS. 1-3 collectively, the aircraft 10 defines a longitudinal centerline 14 that extends therethrough, a vertical direction V, a lateral direction L, a forward end 16, and an aft end 18.

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

In addition, the aircraft 10 of FIGS. 1-3 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. Further, as shown in FIG. 3, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18, such that the BLI fan 106 is incorporated into or blended with a tail section at the aft end 18. However, it should be appreciated that in various other embodiments, some of which will be discussed below, the BLI fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1-3 is provided by way of example only and that in other exemplary embodiments of the present disclosure, any other suitable aircraft 10 may be provided having a propulsion system 100 configured in any other suitable manner.

Figure 4:
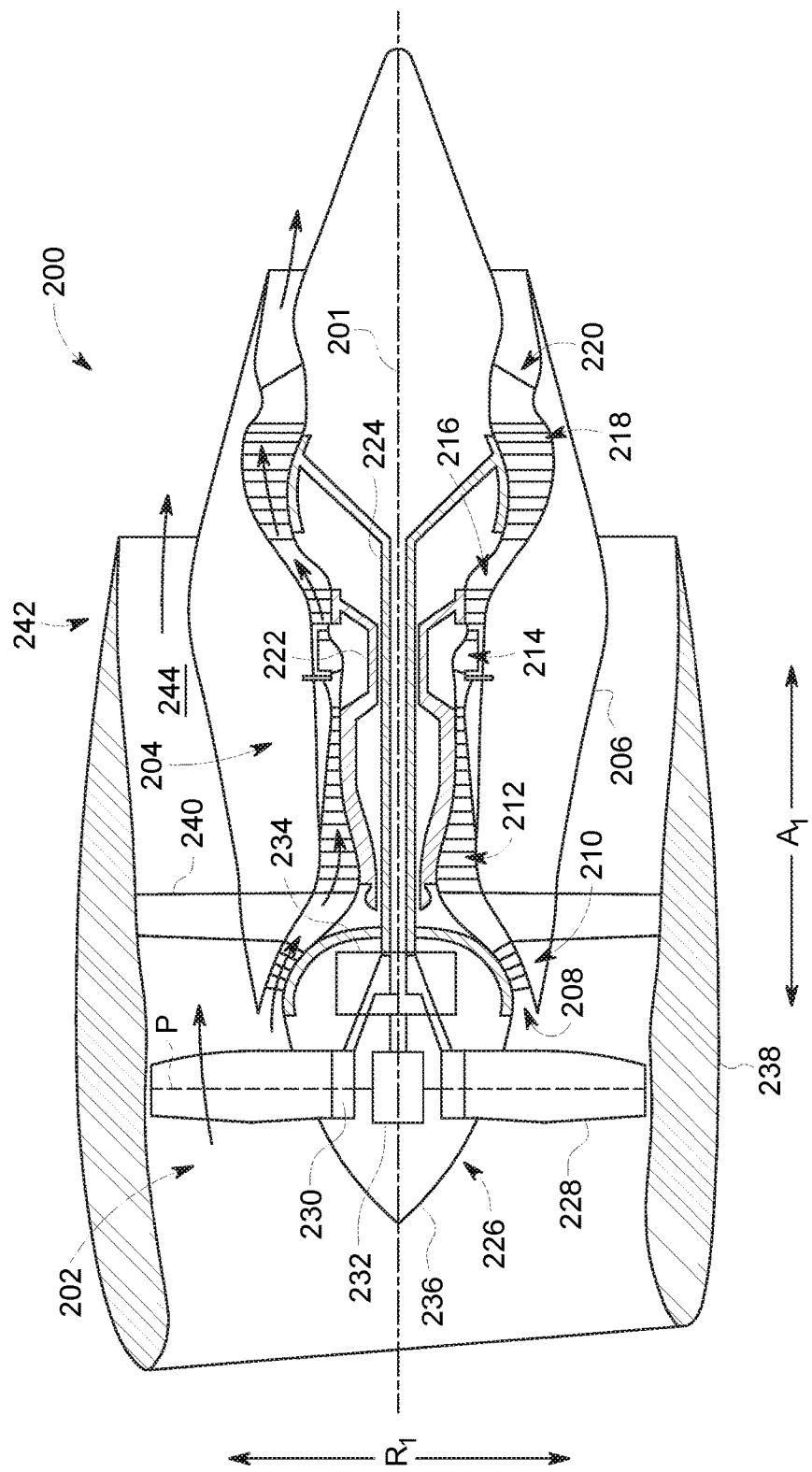
FIG. 4 illustrates a schematic, cross-sectional view of one embodiment of a gas turbine engine mounted to one of the wings of the aircraft of FIG. 1.

Referring now to FIG. 4, in certain embodiments, the jet engines 102, 104 may be configured as high-bypass turbofan jet engines. More specifically, FIG. 4 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 includes a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228 in unison. As such, the fan blades 228, the disk 230, and the actuation member 232 are together rotatable about the longitudinal axis 12 by LP shaft 224 across a power gearbox 234. In certain embodiments, the power gearbox 234 includes a plurality of gears for stepping down the rotational speed of the LP shaft 224 to a more efficient rotational fan speed.

Referring still to FIG. 4, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. It should be appreciated that the outer nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

In addition, it should be appreciated that the turbofan engine 200 depicted in FIG. 4 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine.

Figure 5:
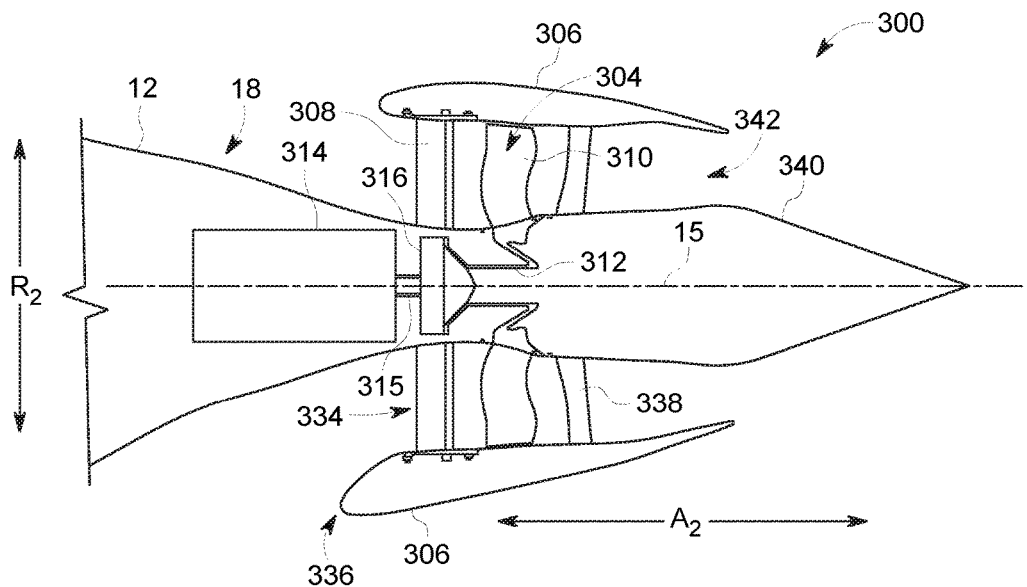
FIG. 5 illustrates a schematic, cross-sectional view of one embodiment of an aft engine according to the present disclosure.
Figure 6:
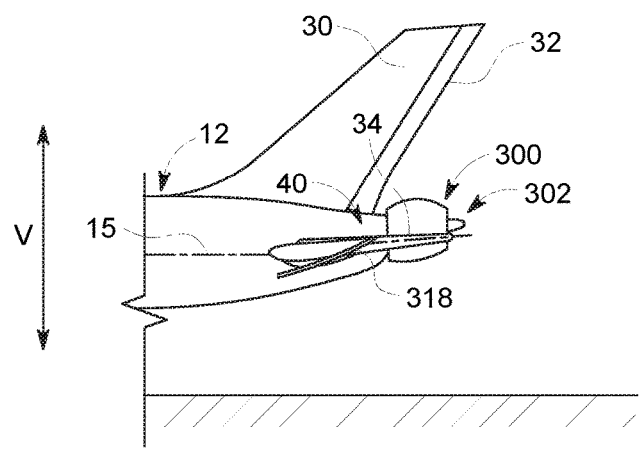
FIG. 6 illustrates a detailed port side view of the aft end of the aircraft according to the present disclosure, particularly illustrating a stabilizer assembly configured with the aft fan.

Referring now to FIG. 5, a schematic, cross-sectional side view of an aft engine in accordance with various embodiments of the present disclosure is provided, such as the aft engine mounted to the aircraft 10 at the tail section 18 of the aircraft 10. More specifically, as shown, the aft engine is configured as a boundary layer ingestion (BLI) fan 300. The BLI fan 300 may be configured in substantially the same manner as the BLI fan 106 described above with reference to FIGS. 1-3 and the aircraft 10 may be configured in substantially the same manner as the exemplary aircraft 10 described above with reference to FIGS. 1-3.

More specifically, as shown, the BLI fan 300 defines an axial direction $A_2$ extending along the central axis 15 that extends therethrough for reference. Additionally, the BLI fan 300 defines a radial direction $R_2$ and a circumferential direction (not shown). In general, the BLI fan 300 includes a fan 304 rotatable about the central axis 15, a nacelle 306 extending around at least a portion of the fan 304, and one or more inlet guide vanes 308 extending between the nacelle 306 and the fuselage 12 of the aircraft 10. More specifically, the fan 304 includes a plurality of fan blades 310 spaced generally along the circumferential direction, and the one or more inlet guide vanes 308 extend between the nacelle 306 and the fuselage 12 of the aircraft 10 at a location forward of the plurality of fan blades 310. Additionally, the inlet guide vanes 308 may be shaped and/or oriented to direct and condition a flow of air into the BLI fan 300 to, e.g., increase an efficiency of the BLI fan 300, or reduce a distortion of the air flowing into the BLI fan 300. Further, the nacelle 306 extends around and encircles the plurality of fan blades 310, and also extends around the fuselage 12 of the aircraft 10 at an aft end 18 of the aircraft 10 when, as shown in FIG. 5, the BLI fan 300 is mounted to the aircraft 10. Notably, as used herein, the term "nacelle" includes the nacelle as well as any structural fan casing.

As is also depicted in FIG. 5, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an exemplary embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, as shown, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

As briefly stated above, the BLI fan 300 includes one or more inlet guide vanes 308 for mounting the BLI fan 300 to the aircraft 10. Further, as shown, the inlet guide vanes 308 extend substantially along the radial direction $R_2$ of the BLI fan 300 between the nacelle 306 and the fuselage 12 of the aircraft 10 for mounting the BLI fan 300 to the fuselage 12 of the aircraft 10. It should be appreciated, that as used herein, terms of approximation, such as "approximately," "substantially," or "about," refer to being within a ten percent margin of error.

In certain exemplary embodiments, the one or more structural members 308 may be configured as fixed inlet guide vanes extending between the nacelle 306 and the fuselage 12 of the aircraft 10. However, for the embodiment depicted, the structural members 308 are configured as variable inlet guide vanes.

In addition, the BLI fan 300 defines an inlet 334 at a forward end 336 between the nacelle 306 and the fuselage 12 of the aircraft 10. As mentioned above, the nacelle 306 of the BLI fan 300 extends around the central axis 15 thereof. Accordingly, for the embodiment depicted, the inlet 334 of the BLI fan 300 extends substantially three hundred sixty degrees (360°) around the central axis 15 of the aircraft 10 and the fuselage 12 of the aircraft 10 when, such as in the embodiment depicted, the BLI fan 300 is mounted to the aircraft 10.

Referring still to FIG. 5, the BLI fan 300 additionally includes one or more outlet guide vanes 338 and a tail cone 340. The outlet guide vanes 338 for the embodiment depicted extend between the nacelle 306 and the tail cone 340 for directing a flow of air through the BLI fan 300, and optionally for adding strength and rigidity to the BLI fan 300. The outlet guide vanes 338 may be evenly spaced along the circumferential direction (similar to the inlet guide vanes 308), or may have any other suitable spacing. Additionally, the outlet guide vanes 338 may be fixed outlet guide vanes, or alternatively may be variable outlet guide vanes. Inclusion of the plurality of outlet guide vanes 338 extending between the nacelle 306 and the tail cone 340 may allow for, e.g., tighter clearances between the plurality of fan blades 310 and the nacelle 306, such that an efficiency of the BLI fan 300 may be maximized.

Further, aft of the plurality of fan blades 310, and for the embodiment depicted, aft of the one or more outlet guide vanes 338, the BLI fan 300 additionally defines a nozzle 342 between the nacelle 306 and the tail cone 340. As such, the nozzle 342 may be configured to generate an amount of thrust from the air flowing therethrough. In addition, the tail cone 340 may be shaped to minimize an amount of drag on the BLI fan 300. However, in other embodiments, the tail cone 340 may have any other shape and may, e.g., end forward of an aft end of the nacelle 306 such that the tail cone 340 is enclosed by the nacelle 306 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring now to FIGS. 6-9, various views of the aft end 18 of the aircraft 10 is illustrated, particularly illustrating the BLI fan 300 mounted thereto and the stabilizer assembly 302 according to the present disclosure. As mentioned in reference to FIGS. 1-3, the aircraft 10 may include one or more horizontal stabilizers 34, such as a pair of horizontal stabilizers 34 mounted on opposing sides of the nacelle 306 of the BLI fan 300. More specifically, as shown, the stabilizer assembly 302 may include one or more generally horizontal stabilizers 34 having an inner portion 318 and an outer portion 319. For example, the near-fuselage inner portion 318 may be modified for the flow condition in the capture stream to the fan 300, whereas the outer portion 319 may be similar to conventional stabilizers having elevators.

For example, as shown, the inner portion 318 extends between a first end 324 and a second end 326, with the first end 324 being mounted to the nacelle 306 of the aft fan 300 and the fuselage 12 at a predetermined downward angle with respect to the central axis 15 of the aft fan 300 so as to direct airflow upwards and into the aft fan 300. More specifically, in certain embodiments, the predetermined downward angle may include an angle from about 20 degrees to about 45 degrees with respect to the central axis 15 in a downward vertical direction V. In further embodiments, the predetermined downward angle may be less than 30 degrees or less than 45 degrees with respect to the central axis 15 in the downward vertical direction V. Further, as shown, the outer portion 319 is mounted to the inner portion 318, e.g. at a second end 326 thereof. Thus, as shown in FIG. 8, an interface 328 between the inner and outer portions 318, 319 is configured to follow a rough streamline 332.

More particularly, in one embodiment, the inner portion 318 of the stabilizer assembly 302 may be integrated with one or more of the inlet guide vanes 308 of the aft fan 300 so as to provide more structural strength to the nacelle 306 of the BLI fan 300. In addition, as shown in FIGS. 7 and 8, the inner portion(s) 318 of the stabilizer assembly 302 may have a longer chord than the outer section(s) 319 of the stabilizer assembly 302.

Figure 7:
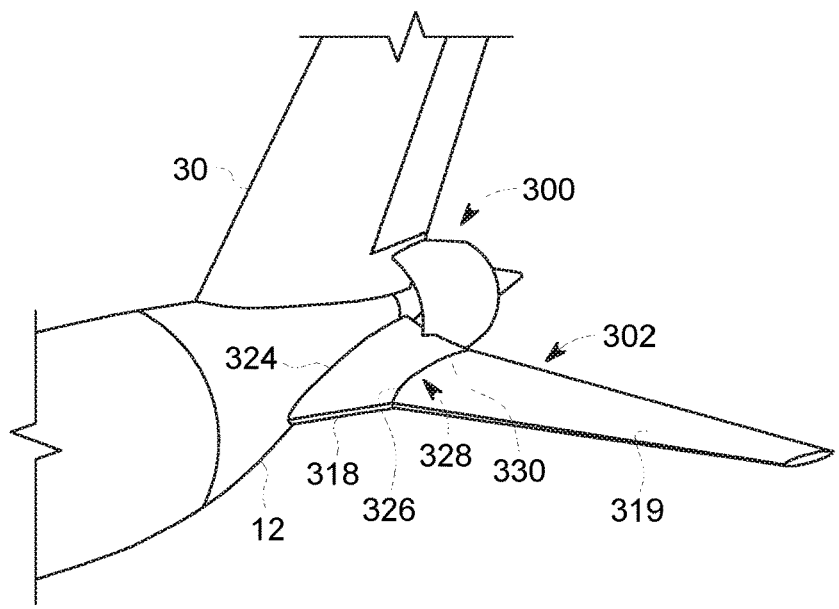
FIG. 7 illustrates a partial perspective view of one embodiment of the empennage of the aircraft according to the present disclosure, particularly illustrating a stabilizer assembly configured with the aft fan.
Figure 8:
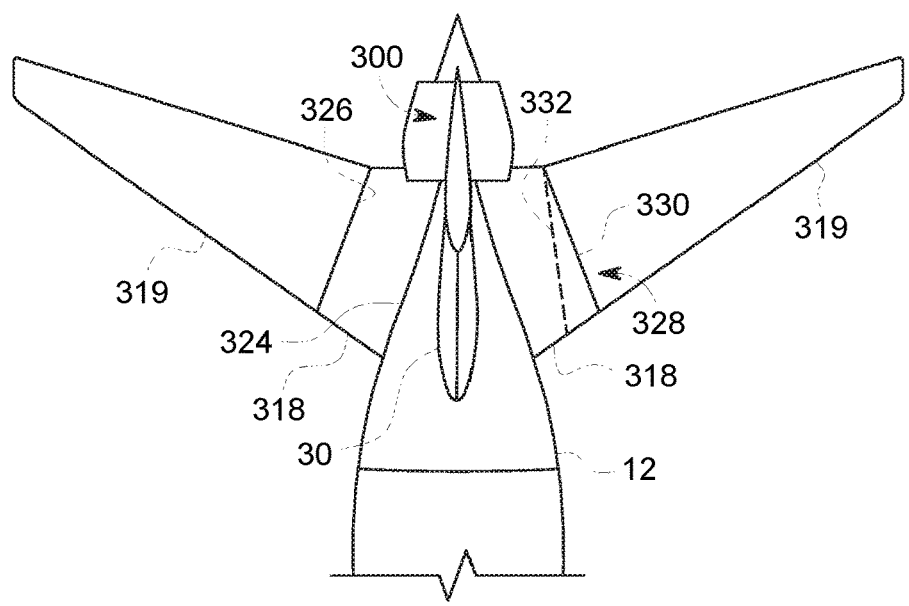
FIG. 8 illustrates a top view of the embodiment of FIG. 7.

In additional embodiments, as shown in FIGS. 7-8, the inner portion(s) 318 may taper from the first end 324 to the second end 326, e.g. such that the second end 326 of the inner portion(s) have substantially the same chord length as a first end 330 (FIG. 8) of the outer portion 319.

Figure 9:
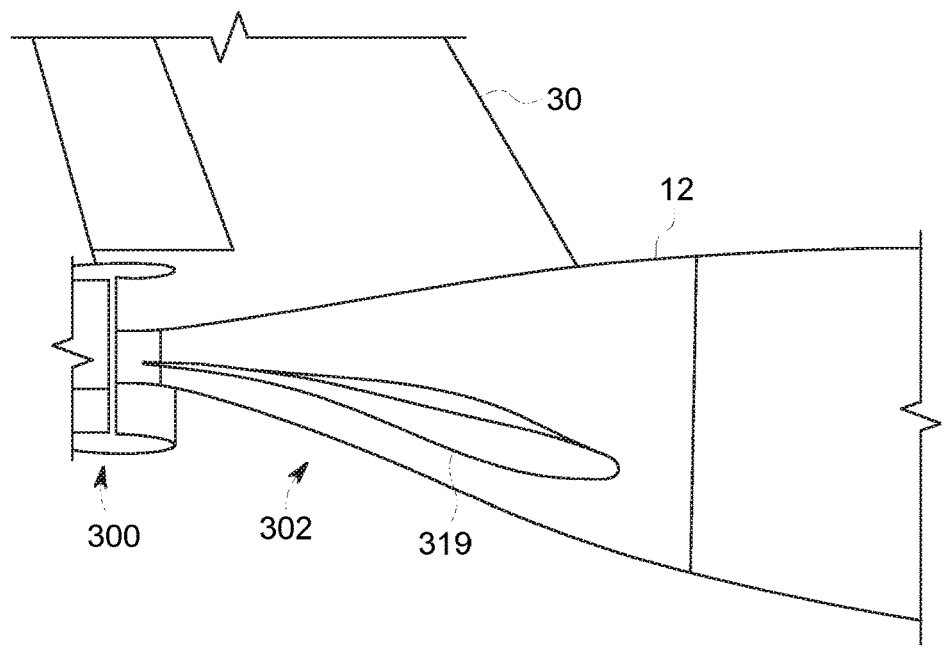
FIG. 9 illustrates a partial side view of the embodiment of FIG. 7, particularly illustrating a cross-sectional view of an inner section of the stabilizer assembly.
Figure 10:
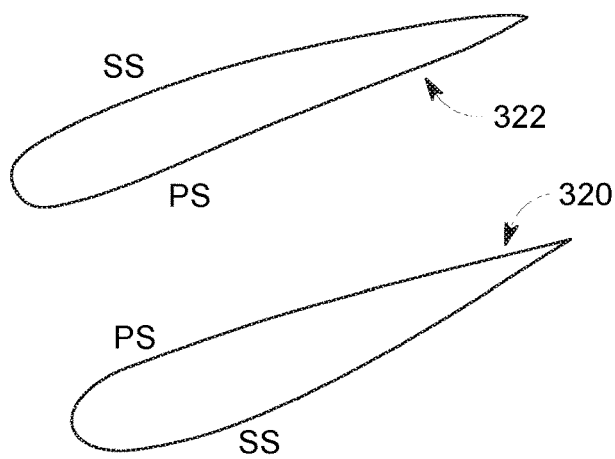
FIG. 10 illustrates cross-sectional views of an upright airfoil and inverted airfoil, respectively, according to the present disclosure.

In additional embodiments, as shown in FIGS. 9 and 10, a cross-section of the inner portion(s) 318 of the stabilizer assembly 302 may include an inverted airfoil cross-section 320. For example, as shown, FIG. 10 illustrates an upright airfoil cross-section 322 and an inverted airfoil cross-section 320 to illustrate the differences, which include the lower pressure side being on the extrados of the wind for the upright airfoil cross-section 322 and the lower pressure side being on the intrados for the inverted airfoil cross-section 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft having a fuselage, the aircraft comprising:
   a propulsion system, the propulsion system comprising:
   an aft engine configured to be mounted to the aircraft at an aft end of the aircraft, the aft engine defining a central axis, the aft engine comprising a fan comprising a plurality of fan blades rotatable about the central axis and a nacelle surrounding the plurality of fan blades;
   a stabilizer assembly comprising:
   at least one generally horizontal stabilizer comprising an inner portion and an outer portion, the inner portion being mounted to the nacelle of the fan and the fuselage at a predetermined downward angle with respect to the central axis so as to direct airflow upwards and into the fan, the outer portion being mounted to the inner portion.

2. The propulsion system of claim 1, wherein the inner portion comprises a longer chord than the outer section of the stabilizer assembly.

3. The propulsion system of claim 1, wherein a cross-section of the inner portion comprises an inverted airfoil cross-section.

4. The propulsion system of claim 1, wherein a cross-section of the inner portion of the stabilizer assembly tapers from a first end to a second end.

5. The propulsion system of claim 1, wherein the predetermined downward angle comprises from about 20 degrees to about 45 degrees with respect to the central axis in a downward vertical direction.

6. The propulsion system of claim 1, wherein the aft engine is configured as a boundary layer ingestion fan, and wherein the additional stabilizers are configured to direct fuselage bottom boundary layer airflow upwards and into the fan.

7. The propulsion system of claim 1, wherein the aft engine is configured to be mounted to an aircraft having a pair of wings, and wherein the propulsion system further includes two or more aircraft engines, each of which mounted to one of the pair of wings of the aircraft.

8. An aircraft having a fuselage, the aircraft comprising:
   a boundary layer ingestion fan assembly for mounting to an aft end of a fuselage of an aircraft, the boundary layer ingestion fan assembly comprising:
   a fan rotatable about a central axis of the boundary layer ingestion fan, the fan comprising a plurality of fan blades;
   a nacelle surrounding the plurality of fan blades of the fan, the nacelle defining an inlet with the fuselage of the aircraft, the inlet extending substantially around the fuselage of the aircraft when the boundary layer ingestion fan is mounted at the aft end of the aircraft;
   a stabilizer assembly comprising:
   at least one generally horizontal stabilizer comprising an inner portion and an outer portion, the inner portion being mounted to the nacelle of the fan and the fuselage at a predetermined downward angle with respect to the central axis so as to direct airflow upwards and into the fan, the outer portion being mounted to the inner portion.

9. The boundary layer ingestion fan assembly of claim 8, wherein the inner portion of the stabilizer assembly is integrated with one or more inlet guide vanes of the aft fan.

10. The boundary layer ingestion fan assembly of claim 8, wherein the inner portion comprises a loner chord than the outer section of the stabilizer assembly.

11. The boundary layer ingestion fan assembly of claim 8, wherein a cross-section of the inner portion comprises an inverted airfoil cross-section.

12. The boundary layer ingestion an assembly of claim 8, wherein a cross-section of the inner portion of the stabilizer assembly tapers from a first end to a second end.

13. The boundary layer ingestion fan assembly of claim 8, wherein the predetermined downward angle comprises from about 20 degrees to about 45 degrees with respect to the central axis in a downward vertical direction.

14. An aircraft having a fuselage, the aircraft comprising:
   An an aerodynamic stabilizer assembly for stabilizing an aft fan mounted to the fuselage of the aircraft, the stabilizer assembly comprising:
   at least two generally horizontal stabilizers for mounting to opposite sides of a nacelle of the aft fan and the fuselage so as to stabilize the aft fan, each of the generally horizontal stabilizers comprising an inner portion and an outer portion, the inner portions being mounted to the nacelle of the aft fan and the fuselage at a predetermined downward angle with respect to a central axis of the aft fan so as to direct airflow upwards and into the aft fan, the outer portion being mounted to the inner portion.

15. The stabilizer assembly of claim 14, wherein the inner portion of the stabilizer assembly is integrated with one or more inlet guide vanes of the aft fan.

16. The stabilizer assembly of claim 14, wherein a cross-section of the inner portion comprises an inverted airfoil cross-section.

* * * * *